3,022,320
POLYCARBOXYDIPHENYL SULFONES AND ANHYDRIDES THEREOF
Ovell Francis Bennett, Woodbury, Melvin L. Huber, Pitman, and Robert A. Smiley, Woodbury, N.J., assignors to E. I. du Pont de Nemours and Company, Wilmington, Del., a corporation of Delaware
No Drawing. Filed Jan. 13, 1959, Ser. No. 786,445
6 Claims. (Cl. 260—346.3)

The present invention relates to novel polycarboxydiphenyl sulfones and to novel anhydrides thereof. More specifically, the present invention involves novel polycarboxydiphenyl sulfones of the type represented by

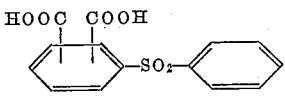

wherein at least two carboxy groups are substituted on at least one phenyl group in positions ortho to each other and the valuable anhydrides of the said polycarboxydiphenyl sulfones.

Carboxydiphenyl sulfones which have been prepared include bis(2-carboxyphenyl) sulfone, bis(2,4-dicarboxyphenyl) sulfone, and bis(4-carboxyphenyl) sulfone. A recent U.S. patent (No. 2,673,218) describes the preparation of mono- and dicarboxydiphenyl sulfones by the catalytic air oxidation of the corresponding diphenyl sulfone with an alkyl group substituted in the meta or para position of at least one ring. However, none of the teachings of the prior art pertain to diphenyl sulfones having the carboxy substituents on adjacent carbon atoms. In fact, until now, the preparation of such compounds by oxidation of the corresponding alkyl-substituted diphenyl sulfones was thought to be impossible as the following statement in the heretofore mentioned U.S. patent indicates:

"Where two alkyl groups are attached to a single benzene nucleus, no oxidation to any significant extent takes place insofar as either of these alkyl groups are concerned if they are ortho in position to each other."

These novel polycarboxydiphenyl sulfones have a variety of uses in that extensive field wherein aromatic polycarboxylic acids conventionally are employed. For example, polycarboxydiphenyl sulfones are intermediates to valuable polymers, dyes, esterlubes, adhesives, plasticizers, and pharmaceuticals. In addition, from polycarboxydiphenyl sulfones having carboxy groups ortho to each other may be formed valuable anhydrides, which, owing to their enhanced chemical reactivity, are useful, in addition to the previously mentioned applications, for curing of epoxy resins and in the manufacture of alkyd resins.

Accordingly, an object of the present invention is the synthesis of heretofore unknown polycarboxydiphenyl sulfones. More specifically an object of the invention is the syntheses of polycarboxydiphenyl sulfones wherein at least one phenyl group contains at least two carboxy substituents which are in ortho position to each other and which polycarboxydiphenyl sulfones are valuable chemical intermediates. A further object is the preparation of anhydrides of the said polycarboxydiphenyl sulfones, these anhydrides being particularly useful as curing agents for epoxy resins. Additional objects will become apparent as the invention is more fully described.

We have found that the foregoing objects are achieved when we prepare polycarboxydiphenyl sulfones by oxidizing by nitric acid at an elevated temperature and superatmospheric pressure a diphenyl sulfone bearing on one or both phenyl groups at least two oxidizable nuclear alkyl substituents in ortho position to each other.

In order to more fully describe the invention, reference is now made to the following examples which illustrate the method of preparing the novel polycarboxydiphenyl sulfones. In all cases, parts are by weight unless indicated otherwise.

EXAMPLE 1

Preparation of Bis(3,4-Dicarboxyphenyl) Sulfone

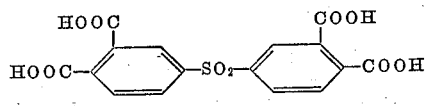

Into a suitably designed reaction vessel was introduced 104 parts of bis(3,4-dimethylphenyl) sulfone and 478 parts by volume of a 35% aqueous solution of nitric acid (ca. 203 parts of nitric acid per se). The reactor was pressurized to 150 pounds per square inch and heated to 200° C. After a 3-hour reaction period at 200° C. during which time the pressure autogenously rose to 555 pounds per square inch, the reaction vessel was cooled and vented. The reaction mixture was removed from the reaction vessel, cooled, and filtered. The resulting filter cake was washed with cold water, dried, and recrystallized from acetic acid to yield 113 parts of bis(3,4-dicarboxyphenyl) sulfone having a neutral equivalence of 98.5 (calcd. neutral equivalence 98.5). An additional 10 parts of product was obtained by concentrating the acetic acid filtrate. A total conversion of 82% was obtained.

The identification of the product was confirmed by its infrared spectrum, elemental analysis, and by the elemental analysis and saponification equivalent of the tetra-n-butyl ester. The results are tabulated below.

| Elemental Analysis | C | H | S | Neutralization Equivalent |
|---|---|---|---|---|
| Calcd. for $C_{16}H_{10}O_{10}S$ | 48.8 | 2.6 | 8.1 | 98.5 |
| Found | 48.6 | 2.8 | 8.3 | 98.5 |
| | | | | Saponification Equivalent |
| Calcd. for $C_{32}H_{42}O_{10}S$ | 62.1 | 6.9 | | 154.7 |
| Found | 62.0 | 6.9 | | 156.3 |

EXAMPLE 2

The following polycarboxydiphenyl sulfones were prepared according to the general procedure outlined in Example 1. In all cases, the structures of the compounds were confirmed by their infrared spectra and by elemental analyses.

thereof, was obtained which had a melting point of 299–302° C. and a neutral equivalent of 113.5 versus 110.8

| Starting Material | | Parts of HNO₃* | Initial Pressure (p.s.i.ga.) | Temp. (° C.) | Time (hrs.) | Product | | Percent Conv. | N.E. | |
|---|---|---|---|---|---|---|---|---|---|---|
| Name | Parts | | | | | Name | Structural Formula | | Calcd. | Found |
| bis(3,4-dimethylphenyl) sulfone. | 16.4 | 32 | 155 | 150–190 | 3.2 | bis(3,4-dicarboxyphenyl) sulfone. | HOOC—⟨ ⟩—SO₂—⟨ ⟩—COOH with HOOC and COOH | 65 | 98.5 | 98.5 |
| 3,4,4'-trimethyldiphenyl sulfone. | 26 | 53.8 | 175 | 130–180 | 4 | 3,4,4'-tricarboxydiphenyl sulfone. | HOOC—⟨ ⟩—SO₂—⟨ ⟩—COOH with HOOC | 57 | 116.8 | 117.7 |
| 2,3',4',5-tetramethyldiphenyl sulfone. | 25 | 50.8 | 300 | 140–182 | 3 | 2,3',4',5-tetracarboxydiphenyl sulfone. | ⟨ ⟩—SO₂—⟨ ⟩—COOH with COOH, COOH, COOH | >50 | 98.5 | 101 |

*In all cases, an aqueous solution of HNO₃ (35%) was used. Tabulated parts are parts by weight of pure HNO₃.

The anhydrides are prepared conventionally from the corresponding polycarboxydiphenyl sulfones as exemplified by the following examples.

EXAMPLE 3

*Preparation of Bis(3,4-Dicarboxyphenyl) Sulfone Dianhydride*

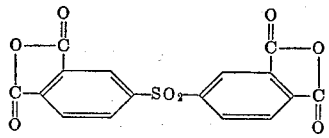

Into a suitably designed reaction vessel was introduced 4 parts of bis(3,4-dicarboxyphenyl) sulfone prepared as described in Example 2 and 54 parts of acetic anhydride. The reaction mixture was refluxed for three hours, reduced in volume to about 40% of its original volume by distilling out acetic anhydride, cooled, and precipitated. The product had a melting point of 275–278° C. (sealed capillary) and a neutral equivalent of 88.8 versus 89.6 calculated for the dianhydride. Elemental analysis of the product gave the following results:

| | Percent C | Percent H |
|---|---|---|
| Calcd. for C₁₆H₆O₈S | 53.7 | 1.7 |
| Found | 53.5 | 1.9 |

Infrared analysis confirmed the presence of a sulfone group and anhydride linkages. A conversion of 92% was obtained.

EXAMPLE 4

*Preparation of 3,4,4'-Tricarboxydiphenyl Sulfone Anhydride*

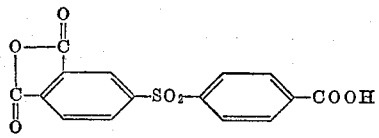

Into an open reaction vessel was introduced 2 parts of 3,4,4'-tricarboxydiphenyl sulfone which subsequently was heated to 300–325° C. A light tan solid, 1.81 parts calculated for the desired anhydride. Elemental analysis gave the following results:

| | Percent C | Percent H | Percent S |
|---|---|---|---|
| Calculated for C₁₅H₇O₇S | 54.1 | 2.43 | 9.66 |
| Found | 54.0 | 2.65 | 9.38 |

Examination of the infrared spectrum confirmed the presence of the anhydride and the sulfone linkages. A conversion of 95.5% was obtained.

As can be seen from the foregoing examples, the novel polycarboxydiphenyl sulfones and their anhydrides are obtainable in good conversions. It will be evident that one or both of the phenyl rings of the alkyl-substituted diphenyl sulfone may bear nuclear substituents that are not easily oxidized. The presence of such substituents does not interfere in the oxidation of the alkyl groups and the resulting product will be similarly substituted. Included in the definition of nonoxidizable substituents are halo, nitro, alkoxy, carboxy, acyloxy, phenyl, and phenyloxy radicals. The positions of the nonoxidizable substituents, with regard to the alkyl groups in the positions herein defined, are not subject to any limitation.

The tetracarboxydiphenyl sulfones bearing on each phenyl group a pair of carboxy groups in ortho position to each other are of particular significance in that they may be dehydrated to form dianhydrides. Such dianhydrides owing to their high degree of chemical reactivity and high molecular weight are particularly useful for curing of epoxy resins.

Additionally, as illustrated in Example 4, anhydride-acids having an anhydride group and one or more free carboxy groups are easily prepared from the herein described polycarboxydiphenyl sulfones having, additionally, one or more carboxy groups in positions other than ortho to each other.

Owing to their relatively low cost and accessibility, the methyl-substituted sulfones were employed in all the preparations exemplified. However, polycarboxydiphenyl sulfones having carboxy groups in the ortho position to each other may be prepared from diphenyl sulfones substituted by any alkyl group oxidizable to a carboxy group. Generally, the alkyl substituents will not contain more than ten carbon atoms.

The stoichiometry of the nitric acid oxidation of methyl substituents on a diphenyl sulfone requires that two moles of nitric acid be present for each methyl substituent being oxidized. Obviously, as the nitric acid is consumed, the rate of oxidation decreases. Therefore, it is desirable to utilize an excess of nitric acid to overcome this dilution factor. However, if too much nitric acid is present, nitration as well as oxidation occurs. Accordingly, in order to obtain the maximum yield of the desired product, the presence of 2-4 moles of nitric acid per mole of methyl or methylene carbon is preferable. The concentration of the nitric acid in the reaction zone should be between 15 and 50 percent in order to attain the best results. Below that range, the oxidation is undesirably slow and above that range, the formation of by-products, i.e., nitration products and/or cleavage products, substantially increases. We have found that very good yields are obtained by employing 35% nitric acid.

The range of temperature also is quite flexible and depends primarily on the concentration of nitric acid, the specific diaryl sulfone to be oxidized, the desired reaction time, and the desired yield. From the standpoint of economics, reaction rate, and maximum yield, we have found that the most satisfactory temperature is between 110 and 300° C., particularly between 150 and 200° C.

Sufficient pressure to maintain a liquid phase must be employed. The specific pressure selected within this limitation is not critical and depends in part on the reaction temperature. Generally, 150 to 200 pounds per square inch gage is satisfactory and within the range of economical operation.

The polycarboxydiphenyl sulfones and anhydrides prepared in the examples of the present specification have not been previously described in the literature. The novel diphenyl sulfones are characterized by bearing two nuclear carboxy substituents ortho to each other on the same phenyl ring. Additionally, the diphenyl sulfone may have a carboxy group adjacent the sulfone group. As stated previously, additional substituents such as nitro, halo, phenyl, phenyloxy, or alkoxy may be present in any of the free nuclear positions. The new compounds have a plurality of valuable utilities among which are the preparation of novel crosslinked polymers and/or novel hardenable epoxy resin compositions. Esters of the compounds may be formed with alcohols containing 1 to 12 carbon atoms. These esters will find a variety of applications as plasticizers, polymer intermediates, and the like. The use of the esters as plasticizers has been found to impart particularly desirable electrical properties to the compositions into which they are incorporated. The anhydrides of the polycarboxydiphenyl sulfones are of particular commercial significance with respect to the utilities previously discussed for the polycarboxydiphenyl sulfones in that no by-product water is formed.

The invention has been described in detail in the foregoing, and we intend to be limited only by the following claims.

We claim:
1. As a novel composition of matter, bis(3,4-dicarboxyphenyl) sulfone.
2. As a novel composition of matter, the dianhydride of bis(3,4-dicarboxyphenyl) sulfone.
3. As a novel composition of matter, 3,4,4'-tricarboxydiphenyl sulfone.
4. As a novel composition of matter, the anhydride of 3,4,4'-tricarboxydiphenyl sulfone.
5. As a novel composition of matter, 2,3',4',5-tetracarboxydiphenyl sulfone.
6. As a novel composition of matter, the anhydride of 2,3',4',5-tetracarboxydiphenyl sulfone.

References Cited in the file of this patent
UNITED STATES PATENTS

| | | |
|---|---|---|
| 2,614,120 | Caldwell | Oct. 14, 1952 |
| 2,673,218 | Caldwell | Mar. 20, 1954 |
| 2,794,822 | Schweitzer | June 4, 1957 |
| 2,895,842 | Caldwell et al. | July 21, 1959 |